United States Patent [19]
Jarman

[11] 3,945,294
[45] Mar. 23, 1976

[54] EXPANDABLE ANCHOR BOLT

[75] Inventor: Davis R. Jarman, Brunswick, Ga.

[73] Assignee: Virgil Hinson, Brunswick, Ga. ; a part interest

[22] Filed: May 28, 1974

[21] Appl. No.: 474,079

[52] U.S. Cl. .............................. 85/63; 85/65; 85/66
[51] Int. Cl.² ......................................... F16B 13/04
[58] Field of Search ...................... 85/64, 65, 63, 66

[56] References Cited
UNITED STATES PATENTS

| 1,487,290 | 3/1924 | Tomkinson | 85/66 |
| 1,506,384 | 8/1924 | Pleister | 85/66 |
| 2,092,341 | 9/1937 | De Vries | 85/66 |
| 2,502,267 | 3/1950 | McPherson | 85/66 |
| 2,950,602 | 8/1960 | Lang | 85/63 |

Primary Examiner—Marion Parsons, Jr.
Attorney, Agent, or Firm—Clarence A. O'Brien; Harvey B. Jacobson

[57] ABSTRACT

An anchor bolt having an expandable housing containing a fluid material and disposed in a casing arrangeable extending through a floor or other partition. Compression of the fluid material in the expandable housing causes the material to expand the housing through one or more slots provided in the casing and prohibit the housing from passing back through the floor.

1 Claim, 6 Drawing Figures

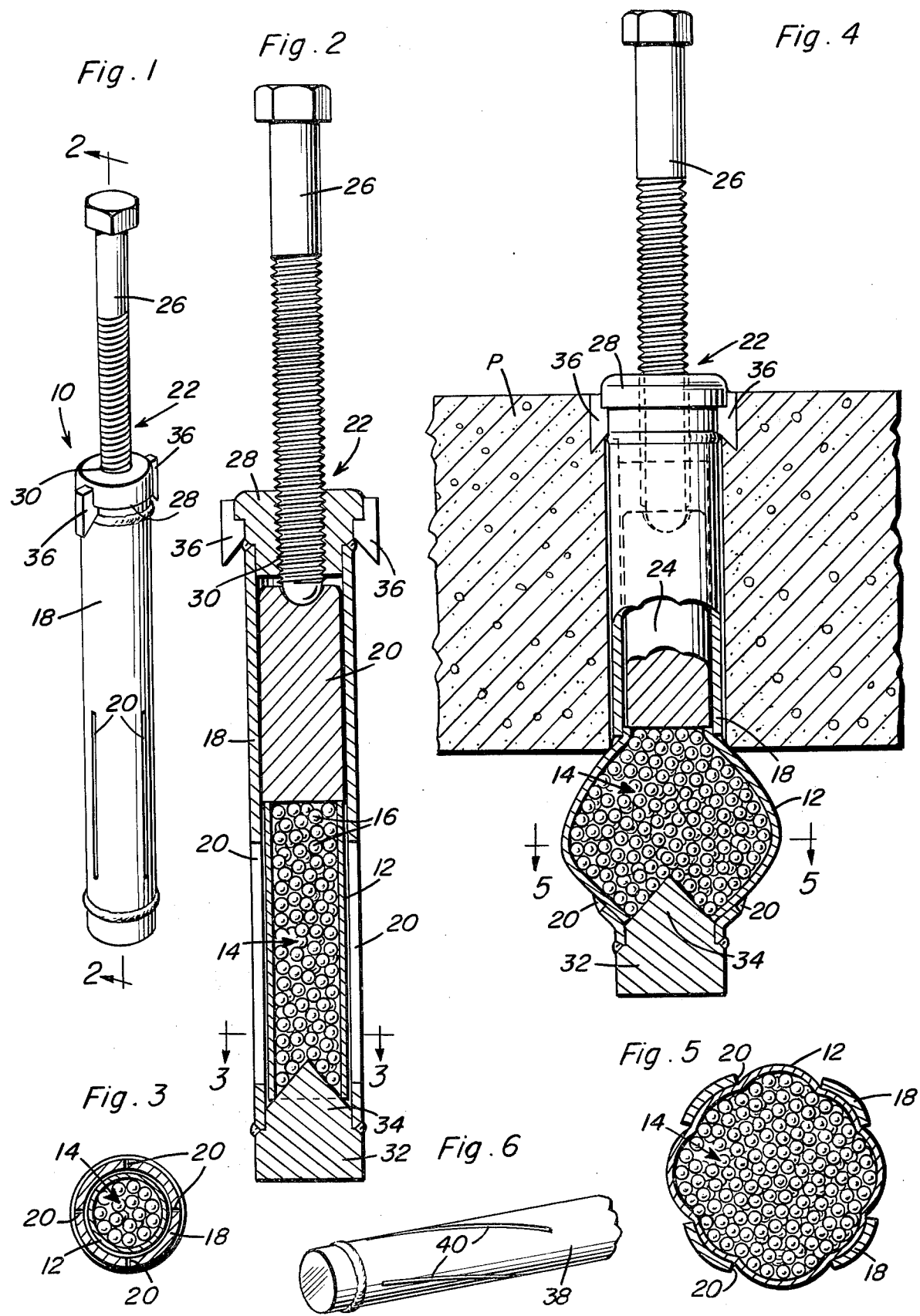

EXPANDABLE ANCHOR BOLT

BACKGROUND OF THE INVENTION

1. Field of the Invention

This invention relates generally to an anchor suitable for fastening loads to a floor, and the like, and particularly to an anchor bolt especially intended for mounting heavy machinery, and the like, which is subject to vibration on concrete floors and similar structures.

2. Description of the Prior Art

Conventional anchor bolts used to secure machinery and the like structures to a, for example, concrete floor expand within the bore of a hole drilled in the concrete. That is, the bolt does not pass all the way through the concrete slab or other mounting structure. Normally, an anchor using the entire slab or reinforced concrete as a support has to be installed at the time the concrete is poured.

SUMMARY OF THE INVENTION

It is an object of the present invention to provide an anchor bolt that extends below the level of a floor or other partition being used as a supporting element.

It is another object of the present invention to provide a passthrough expandable anchor bolt that may be installed either at the time of or subsequent to construction of the support element.

It is still another object of the present invention to provide an expandable anchor bolt of simple yet rugged and reliable construction.

These and other objects are achieved according to the present invention by providing an anchor bolt having: an expandable housing; a fluid material arranged in the expandable housing; a casing arrangeable extending through a partition for positioning the expandable housing adjacent the partition; and an actuator arrangement associated with the casing for compressing the fluid material and causing same to expand the expandable housing when the latter is adjacent the partition and prohibiting the housing from passing back through the partition.

The casing is advantageously provided with one or more slots arranged for permitting the expandable housing to expand therethrough.

An actuator arrangement according to the present invention advantageously includes a piston movably disposed in the casing, a screw-threaded rod connected to the piston and extending out of the casing in a direction away from the expandable housing, and a cap mounted on an end of the casing spaced from the expandable housing. The cap may be provided with a screw-threaded bore with which the rod threadingly engages to permit movement of the piston toward and away from the expandable housing by rotation of the screw-threaded rod.

The cap is advantageously provided with claws which prevent rotation of the cap, and its associated casing, relative to a partition in which the anchor bolt is inserted.

These together with other objects and advantages which will become subsequently apparent reside in the details of construction and operation as more fully hereinafter described and claimed, reference being had to the accompanying drawings forming a part hereof, wherein like numrals refer to like parts throughout.

BRIEF DESCRIPTION OF THE DRAWINGS

FIG. 1 is a perspective view showing an anchor bolt according to the present invention.

FIG. 2 is a sectional view taken generally along the line 2—2 of FIG. 1, but drawn to a larger scale.

FIG. 3 is a sectional view taken generally along the line 3—3 of FIG. 2.

FIG. 4 is a fragmentary, partly vertical sectional view showing the anchor bolt of FIGS. 1 through 3 arranged in a concrete slab.

FIG. 5 is a sectional view taken generally along the line 5—5 of FIG. 4.

FIG. 6 is a fragmentary, perspective view showing a modified embodiment of an anchor bolt according to the present invention.

DESCRIPTION OF THE PREFERRED EMBODIMENTS

Referring now more particularly to FIGS. 1 through 5 of the drawings, an anchor bolt 10 according to the present invention has an expandable housing 12 in which is arranged a fluid material 14. This material 14 is advantageously the illustrated plurality of spheres or balls 16, which may be conventional ball bearings, and the like. It is to be understood, however, that any suitable fluid, or fluent, material may be used as material 14. While material 14 is preferably incompressible, it is even possible to employ a compressible fluid, such as a gas, in place of the illustrated balls 16. A casing 18 arrangeable extending through a partition P for positioning housing 12 adjacent partition P encloses expandable housing 12 in the illustrated manner. Advantageously, casing 18 is a length of tubing, or a hollow cylinder, provided with a plurality of lengthwise extending slots 20. Expandable housing 12 is a sleeve constructed from a ductile material, such as soft metal, arranged in casing 18 for expansion through slots 20. Copper, aluminum, steel mesh, and the like, have been found suitable for construction of housing 12.

An actuator arrangement 22, to be described in detail below, is associated with casing 18 for compressing material 14 and causing same to expand housing 12 when the latter is adjacent the partition and prohibiting the housing from passing back through the partition.

The expanded position of housing 12 is illustrated in FIGS. 4 and 5 of the drawings.

Arrangement 22 includes a piston 24 movably disposed in casing 18, a screw-threaded rod 26, which may be the illustrated conventional bolt, connected to piston 24 and arranged extending out of casing 18 in a direction away from housing 12 and material 14, and a cap 28 mounted on the upper, outer, or front end of casing 18 which is spaced from housing 12. This cap 28 is provided with a screw-threaded bore 30 with which rod 26 threadingly engages. Any suitable fastening technique, such as welding, brazing, and the like, may be used to attach cap 28 to casing 18. In this manner, the cap 28 and casing 18 will form a single unit.

Casing 18 is also advantageously provided with a plug 32 at the end of casing 18 adjacent housing 12 for enclosing that end of casing 18 and forming an end of housing 12. Plug 32 advantageously has a conical portion 34 directed into casing 18 for wedging balls 16 toward slots 20. In other words, portion 34 forms a point extending into housing 12 which performs a wedging action on balls 16 when piston 24 is moved toward plug 32 and compresses balls 16 to cause housing 12 to expand to its FIG. 4 position. Plug 32 may be attached to a respective end of casing 18 in any suitable, known manner, such as welding, brazing, and the like.

Alternatively to the illustrated solid, cylindrical piston 24 and conical portion 34, a pair of large balls (not shown) could be used to compress the fluid material 14. One ball would be under the influence of rod 26, while the other ball would be arranged adjacent a plug similar to plug 32.

The sides of cap 28 are advantageously crimped so as to form claws 36 which grip into the material of partition P and prevent rotation of the cap and its associated casing 18 relative to the partition P.

Referring now to FIG. 6 of the drawings, an anchor bolt according to the present invention may have a casing 38 similar to casing 18, but wherein slots 40 are arranged in spiral orientation.

As mentioned above, the sleeve forming housing 12 may be constructed with either a continuous surface or as a, for example, wire mesh. The important consideration here is that balls 16, or other material used in place of balls 16, cannot jump out or otherwise be removed from the housing.

As can be readily understood from the above description and from the drawings, an anchor bolt 10 functions as an anchor for fastening loads to a point below the level of a floor or similar partition. The anchor bolt, which may be constructed from steel and the like, has an inner housing 12 which is filled with, for example, steel ball bearings and is compressed as the bolt forming rod 26 is tightened so as to force the soft inner housing 12 full of ball bearings to expand through slots 20, 40 and up towards the bottom of the concrete floor. By having the lower portion of the bolt expand beneath the concrete floor rather than in the concrete floor, much greater holding power is provided and the anchor bolt is not subject to loosening because of vibration.

An anchor bolt according to the present invention may be used for different size bolts; that is, for different size bolts forming rod 26. This is accomplished merely by providing a threaded bore 30 to fit the size of bolt employed. Rotation of a bolt forming rod 26 will tighten piston 24 against balls 16 by forcing the piston down against the balls and cause the balls to push out in all directions. Plug 32 prevents the balls 16 from being forced out of casing 18 through the end associated with plug 32, and conical portion 34 of plug 32 pushes balls 16 outward so as to spread the inner, expandable housing 12, as well as casing 18 (FIG. 5), outwardly.

Sleeve 12 could be made of rubber or plastic and the whole anchor made of plastic.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An anchor bolt, comprising, in combination:
   a. an open ended expandable housing;
   b. a fluid material arranged in the expandable housing;
   c. support means including a casing provided with at least one slot arrangeable extending through a hole in a partition for positioning the expandable housing through the partition; and
   d. actuator means for compressing the fluid material and causing same to expand the expandable housing when the latter is through the partition and prohibiting the housing and casing from passing back through the hole in the partition, the expandable housing being arranged in the casing for expansion through the slot, said casing being in the form of a length of tubing provided with a plurality of substantially parallel coextensive, lengthwise extending, normally closed slots adjacent an end of the tubing, the expandable housing is a sleeve arranged in the end of the tubing provided with the slots and constructed from a ductile material, and the fluid material is a plurality of balls, said actuator means including a generally cylindrical elongated piston movably and guidingly disposed in the casing and abutting an end of the expandable housing, a screw-threaded bolt connected to the piston and arranged extending from the casing in a direction away from the expandable housing, said bolt having a rounded end received in a socket in the end of the piston remote from the balls to maintain the threaded bolt in alignment with the piston and a cap mounted on an end of the casing spaced from the expandable housing, the cap being provided with a screw-threaded bore with which the bolt threadingly engages, said casing being provided with a plug arranged at an end of the casing adjacent the expandable housing and spaced from the cap, the plug having a conical portion directed into the other open end of the expandable housing within the casing for wedging the balls toward the slots said cap being provided with means for preventing rotation of the cap relative to the partition, said actuator means being arranged extending from the casing at one side of the partition, and the casing extends through the partition, with the slots being arranged in a portion of the casing extending beyond the partition from a side of the partition spaced from the one side with the casing expanding to a size larger than the hole through the partition with the slots opening to permit the housing to expand to a size larger than the hole for engaging the periphery of the hole with a substantially continuous area of contact.

* * * * *